United States Patent
Lawrence

(10) Patent No.: US 8,099,357 B2
(45) Date of Patent: Jan. 17, 2012

(54) AUTOMATED POLITICAL RISK MANAGEMENT

(75) Inventor: David Lawrence, New York, NY (US)

(73) Assignee: Goldman Sachs & Co., New York, NY (US)

( * ) Notice: Subject to any disclaimer, the term of this patent is extended or adjusted under 35 U.S.C. 154(b) by 0 days.

(21) Appl. No.: 12/698,896

(22) Filed: Feb. 2, 2010

(65) Prior Publication Data

US 2010/0138262 A1 Jun. 3, 2010

Related U.S. Application Data

(63) Continuation of application No. 11/672,373, filed on Feb. 7, 2007, now Pat. No. 7,711,637, which is a continuation of application No. 09/772,427, filed on Jan. 30, 2001, now Pat. No. 7,181,428.

(51) Int. Cl.
*G06Q 40/00* (2006.01)

(52) U.S. Cl. ........... 705/38; 705/35

(58) Field of Classification Search ......... 705/35, 705/38
See application file for complete search history.

(56) References Cited

U.S. PATENT DOCUMENTS

| | | | |
|---|---|---|---|
| 5,177,342 A | 1/1993 | Adams | |
| 5,696,907 A | 12/1997 | Tom | |
| 5,732,397 A | 3/1998 | DeTore et al. | |
| 5,991,743 A | 11/1999 | Irving et al. | |
| 6,078,904 A | 6/2000 | Rebane | |
| 6,078,905 A | 6/2000 | Pich-LeWinter | |
| 6,085,175 A | 7/2000 | Gugel et al. | |
| 6,119,103 A * | 9/2000 | Basch et al. | 705/35 |
| 6,151,688 A | 11/2000 | Wipfel et al. | |
| 6,219,805 B1 | 4/2001 | Jones et al. | |
| 6,321,212 B1 | 11/2001 | Lange | |
| 6,341,267 B1 | 1/2002 | Taub | |
| 6,349,290 B1 | 2/2002 | Horowitz et al. | |

(Continued)

FOREIGN PATENT DOCUMENTS

GB 2354608 3/2001

(Continued)

OTHER PUBLICATIONS

Lewin, Rebecca (Banks Use AI to Battle Fraud, Bank Systems and Technology, v32 n11 p. 22(1) Nov. 1995.*

(Continued)

*Primary Examiner* — Ojo O Oyebisi
(74) *Attorney, Agent, or Firm* — Chadbourne & Parke LLP; John A. Squires

(57) ABSTRACT

A risk management method and system for facilitating analysis and quantification of risk associated with politically exposed persons is disclosed. A computerized political risk management system maintains a database relating individuals to politically sensitive positions and world events. A rating system is used to assess risk based upon criteria such as a position held, historical data and/or interpretation of world events. The system can generate a risk quotient or other rating based upon a weighted algorithm applied to the criteria. The risk quotient is indicative of risk associated with an account. Actions commensurate with a risk quotient can be presented to an institution to help the institution properly manage risk associated with a politically exposed person. A log or other stored history can be created such that utilization of the system can mitigate adverse effects relating to a problematic account. Mitigation can be accomplished by demonstrating to regulatory bodies, shareholders, news media and other interested parties that corporate governance is being addressed through tangible risk management processes.

21 Claims, 5 Drawing Sheets

U.S. PATENT DOCUMENTS 6,513,018 B1     1/2003    Culhane

FOREIGN PATENT DOCUMENTS

| WO | WO 9621903 | | 7/1996 |
| --- | --- | --- | --- |
| WO | WO 9854667 | | 12/1998 |
| WO | WO 0075820 | | 12/2000 |
| WO | WO 0075836 | | 12/2000 |
| WO | WO 0075836 A2 | * | 12/2000 |
| WO | WO 0155885 | | 8/2001 |

OTHER PUBLICATIONS

Cosset et al., "Political risk and the benefits of international portfolio diversification," Journal of International Business Studies, vol. 26, No. 2, pp. 301-318, 1995.

Supplementary European Search Report of the European Patent Office, mailed Apr. 13, 2007, for EP 02 70 1971, 2pgs.

PCT International Search Report dated Jun. 14, 2002 for PCT/US02/01016, 4 pgs.

Banasiak, "Don't Be Out-Scored by Your Competition," Credit and Financial Management Review, 2nd quarter 2000, 8 pgs., http://www.paynetonline.com/viewpaf.asp, Apr. 15, 2002.

Lewin, Banks Use Artificial Intelligence to Battle Fraud, Avoid Risks, Nov. 1995, p. 1.

* cited by examiner

AUTOMATED POLITICAL RISK MANAGEMENT

CROSS-REFERENCE TO RELATED APPLICATIONS

This application is a continuation of, and claims benefit of and priority to U.S. patent application Ser. No. 09/772,427 entitled "Automated Political Risk Management" filed Jan. 30, 2001.

BACKGROUND

This invention relates generally to a method and system for facilitating the identification, investigation, assessment and management of legal, regulatory financial and reputational risks ("risks"). In particular, the present invention relates to a computerized system and method for banks and non-bank financial institutions to manage risks associated with maintaining investment accounts for a politically identified person (PIP).

Risk associated with maintaining an investment account can include factors associated with financial risk, legal risk, regulatory risk and reputational risk. Financial risk includes factors indicative of monetary costs that the financial institution may be exposed to as a result of opening a particular account and/or transacting business with a particular client. Monetary costs can be related to fines, forfeitures, cost to defend an adverse position, or other related potential sources of expense. Regulatory risk includes factors that may cause the financial institution to be in violation of rules put forth by a regulatory agency such as the Securities and Exchange Commission (SEC). Reputational risk relates to harm that a financial institution may suffer regarding its professional standing in the industry. A financial institution can suffer from being associated with a situation that may be interpreted as contrary to an image of honesty and forthrightness.

Risk associated with an account for a PIP can be greatly increased due to the nature of a position held by the PIP along with the power and knowledge associated with that position. PIPs can include an elected official, a bureaucrat, a political appointee, a World Bank Official, a military person, or other individual associated with a sovereign power or international organization. In addition, a PIP can be a person who holds a position in the private sector wherein the position is associated with politically sensitive influences. As part of due diligence associated with managing financial accounts, it is imperative for a financial institution to "Know their Customer" including such attributes as a position held by the customer and the magnitude of risk associated with that position.

Compliance officers and other financial institution personnel typically have few resources available to assist them with the identification of present or potential risks associated with a particular investment or trading account associated with a PIP. Risk can be multifaceted and far reaching. The amount of information that needs to be considered to evaluate whether an individual is a PIP, and whether a particular PIP poses a significant risk, is substantial, if not overwhelming. A multi-agency working group drawn from the U.S. Justice and Treasury Departments and various federal agencies issued guidelines to meet the perceived threat arising from the transmission of the proceeds of foreign political corruption to U.S. financial institutions. These guidelines are designed to counsel banks, broker-dealers, and other financial institutions on their obligations with regard to funds that appear to be related to the theft of sovereign assets by foreign political leaders. The guidelines follow in the wake of embarrassing disclosures relating to the transmission of funds to U.S. financial institutions by a long list of foreign leaders including the Marcos family of the Philippines, Raul Salinas of Mexico, and General Abacha of Nigeria.

However, financial institutions do not have available a mechanism which can provide real time assistance to assess a risk factor associated with a PIP, or otherwise qualitatively manage such risk. In the event of investment problems, it is often difficult to quantify to regulatory bodies, shareholders, newspapers and/or other interested parties, the diligence exercised by the financial institution to properly identify and respond to risk factors. Absent a means to quantify good business practices and diligent efforts to contain risk, a financial institution may appear to be negligent in some respect.

While the guidelines offered by the U.S. federal government are only advisory and therefore not a law, rule or regulation, according to the guidelines, deficiencies in a financial institution's anti-money laundering controls may prompt a regulator to require that the guidance be integrated into the institutions policies and procedures.

What is needed is a method and system to assist with risk management and due diligence related to financial accounts associated with a PIP. A new method and system should anticipate offering guidance to personnel who interact with clients and help the personnel identify PIP. In addition, it should be situated to convey risk information to a compliance department and be able to demonstrate to regulators that a financial institution has met standards relating to risk containment.

SUMMARY

Accordingly, the present invention provides a risk management method and system for facilitating analysis and quantification of risk associated with politically exposed persons. An automated political risk management system maintains a database relating individuals to politically sensitive positions and world events. A rating system is used to assess risk based upon criteria such as a position held, historical data and/or interpretation of world events. The system can generate a risk quotient or other rating based upon a weighted algorithm applied to the criteria, wherein the risk quotient is indicative of risk associated with an account. The quotient can be monitored on a periodic basis, during the course of transactions, upon account opening or on demand. Actions commensurate with a risk quotient can be presented to a financial institution to help the institution properly manage risk associated with a PIP.

A log or other stored history can be created such that utilization of the system can mitigate adverse effects relating to a problematic account. Mitigation can be accomplished by demonstrating to regulatory bodies, shareholders, news media and other interested parties that corporate governance is being addressed through tangible risk management processes. An implementing institution may include, for example, a bank, a trading institution, an insurance company, a credit card issuer, a trading exchange, a government regulator or a law enforcement agency.

In another aspect, a computer system for providing risk management relating to opening accounts can include a computer server that is accessible with a network access device via a communications network and executable software stored on the server which is executable on demand via the network access device. The software can be operative with the server to receive information relating to risk factors and formulate a risk quotient or other rating. In addition, where applicable, risk can be aggregated, such as by rating, and transferred.

The present invention includes a computer-implemented method for managing risk related to financial transactions involving a politically identified person, the method includes receiving information relating to political exposure associated with a person involved in a financial transaction and structuring the information received according to political exposure risk quotient criteria. A risk quotient is calculated using the structured information. A suggested action responsive to the risk quotient or the information received can also be generated.

Typically the suggested actions will be directed towards reducing risk relating to an account associated with a politically exposed person, although actions can be directed towards law enforcement or other directives also. In one embodiment, the action can include refusing to open an account or perform a transaction. Another action may involve notifying an authority, such as the police.

The information received can be gathered electronically or manually and can include the identity of a politically identified person and the person's relationship to an account holder. The information received can also include the identity of a secrecy jurisdiction.

In another aspect, the information received can be stored, as can the risk quotient and the suggested action, and utilized to generate a diligence report. The diligence report can include information received relating to political exposure and actions taken responsive to the risk quotient.

Still another aspect can include aggregating risk quotients relating to a financial institution to assess a level of politically identified risk to which the financial institution is exposed. An average risk quotient associated with a transaction can also be calculated.

Other embodiments include a computerized system for managing risk associated with a financial account, computer executable program code residing on a computer-readable medium, a computer data signal embodied in a digital data stream, or a method of interacting with a network access device. Various features and embodiments are further described in the following figures, drawings and claims.

DETAILED DESCRIPTION

The present invention includes a computerized method and system for managing risk associated with financial accounts that are held by a politically identified person (PIP). A computerized system stores information in a database or other data storing structure and relates the information to individuals with political exposure resulting from sensitive positions and/or world events. A rating system is used to assess risk based upon criteria, such as, a position held, historical data and/or interpretation of world events. A risk quotient or other rating can be generated to readily indicate a level of risk associated with a PIP. The risk quotient can be based upon a weighted algorithm applied to the criteria. Compliance personnel from a financial institution, or other person, can monitor the risk quotient on demand in real time, on account opening, or on a periodic basis. Actions commensurate with a risk quotient can be presented to a financial institution to help the institution properly manage risk associated with a PIP.

Figure 1:
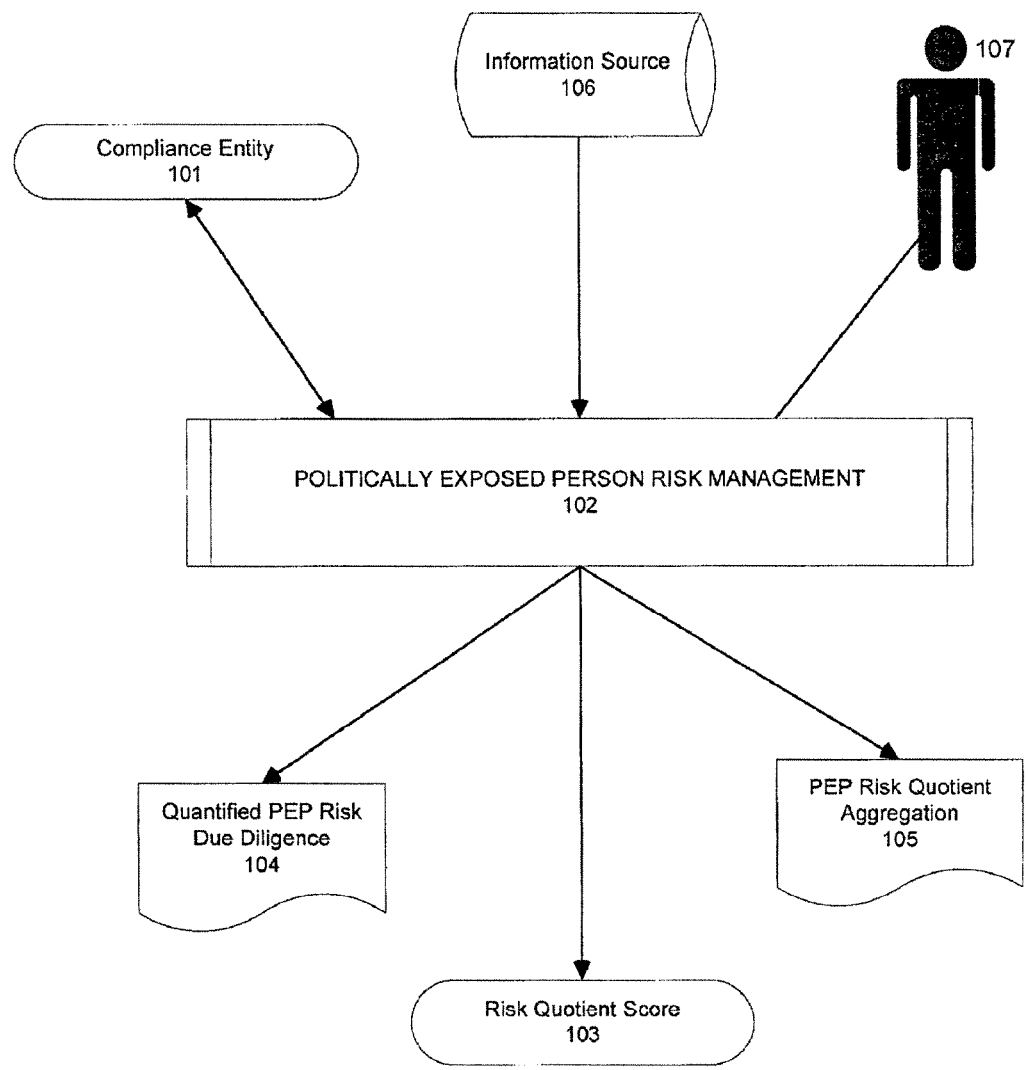
FIG. 1 illustrates a block diagram which can embody this invention.

Referring now to FIG. 1 a block diagram of one embodiment of the present invention is illustrated. A compliance entity 101, such as a financial institution representative, a regulatory official, a security person or other person, or even a programmable robot, supplies information into a PIP system 102 for risk management. The information can be responsive to a predetermined set of questions and input with a computer input device or the information can be gathered electronically, such as through a newsfeed, database, Internet search, or other data source 106. In one embodiment, a compliance entity 101 can view questions on a graphical user interface (GUI) and in turn ask a transaction participant 107 appropriate questions during an account opening interview, or the transaction participant 107 can input the information directly into the PIP system 102.

A decision by a financial institution concerning whether to pursue a financial transaction can be dependent upon many factors. A multitude and diversity of risks related to the factors may need to be identified and evaluated. In addition, the weight and commercial implications of the factors and associated risks can be interrelated. The present invention can provide a consistent and uniform method for business, legal, compliance credit and other personnel of financial institutions to identify and assess risks associated with a transaction. A PIP system 102 allows investment activity risks to be identified, correlated and quantified by financial institutions thereby assessing legal, regulatory, financial and reputational exposure.

Financial institutions are often closely regulated. As a result financial institutions are exposed to significant risks from their obligations of compliance with the law and to prevent, detect and, at times, report potential violations of laws, regulations and industry rules ("laws"). These risks include, but are not limited to, the duty to disclose material information, and to prevent and possibly report: fraud, money laundering, foreign corrupt practices, bribery, embargoes and sanctions. Through a series of structured questions and weighting of information received as answers, financial institutions can structure a risk exposure and receive suggested responses to a specific risk scenario.

A financial institution can integrate a PIP system 102 as part of legal and regulatory oversight for various due diligence and "know your customer" obligations imposed by regulatory authorities. The PIP system 102 can facilitate detection and reporting of potential violations of law as well as address the "suitability" of a financial transaction and/or the assessment of sophistication of a customer. Similarly, the PIP system 102 can support a financial institution's effort to meet requirements regarding the maintenance of accurate books and records relating to their financial transactions and affirmative duty to disclose material issues affecting an investor's decisions.

An institution that may implement, or make use of the present invention can include an investment bank, a merchant bank, a commercial bank, a security firm, an asset management company, a hedge fund, a mutual fund, a credit rating agency, a security exchange and bourse, an institutional or individual investor, an auditing firm, a law firm, or other institution who may be involved with financial transactions. Similarly, financial investments can include investment and merchant banking, public an private financing, commodities and a securities trading, commercial and consumer lending, asset management, rating of corporations and securities, public and private equity investment, public and private fixed income investment, listing to companies on a securities exchange and bourse, employee screening, auditing of corporate or other entities, legal opinions relating to a corporate or other entity, or other business related transactions.

A log or other stored history can be created such that utilization of the system can mitigate adverse effects relating to a problematic account. Mitigation can be accomplished by demonstrating to regulatory bodies, shareholders, news media and other interested parties that corporate governance is being addressed through tangible risk management processes. An implementing institution may include, for example, a bank, a trading institution, an insurance company, a credit card issuer, a trading exchange, a government regulator or a law enforcement agency.

Information relating to financial, legal, regulatory and/or reputational risk is received into a computer system. The computer system applies an algorithm that weights the input information and calculates a risk quotient or similar rating. The risk quotient can include a scaled numeric or alphanumeric value.

If an account reaches or exceeds a risk quotient threshold, the system responds with a predetermined action. Actions can include, for example, generating an alert, blocking acceptance of a transaction, creating a report, notifying a compliance department, or other appropriate response. In addition, the system can create a structured history relating to a new account that can demonstrate due diligence and proper corporate governance. Reporting can be generated from the structured history.

In the case of an automated account opening, such as for example, opening an online account, questions can be presented to the account opener by a programmable robot via a GUI. Questions can relate to a particular type of account, a particular type of client, types of investment, or other criteria. Other prompts or questions can aid a financial institution ascertain the identity of the account holder and the account's beneficial owner. If there is information indicating that a proposed account is beneficially owned by a PIP, the financial institution may not wish to open an account if it is unable to determine the identity of the PIP and his or her relationship to the account holder. The PIP system 102 can identify "secrecy jurisdictions" for the financial institution and advise a financial institution to require PIPs from such jurisdictions to provide an identification and source of wealth information. In addition, the PIP system 102 may suggest that the financial institution require a PIP to waive local law secrecy protections and aid the financial institutions in determining whether a legitimate reason exists for a secrecy request.

A secrecy jurisdiction can include any sovereign state that affords statutory, common law, or other protection to information pertinent to regulatory issues. In addition, a financial institution, a PIP system 102 provider, or other party can be allowed to add jurisdictions of concern to a list of secrecy jurisdictions.

A PIP system 102 can also assist a financial institution to obtain adequate documentation to identify the PIP and help the institution assess a PIP's business reputation. The PIP system 102 can document the PIP's purpose for opening the account and the PIP's anticipated account activity. It can also make a determination as to whether the PIP has a legitimate reason, such as legitimate business or investment activity, for wanting an account in a jurisdiction, such as the United States, The PIP system 102 can also provide questions, historical data, world events information and other targeted information to facilitate a determination regarding a PIP's sources of wealth and of the particular funds involved with an account or transaction in consideration. In addition, the PIP system 102 can measure account activity against a PIP's official salary and other sources of wealth and report on discrepancies.

Questions or prompts proffered by the PIP system 102 can also depend from previous answers. Information received in response to the questions can be input into the PIP system 102 from which it can be utilized for real time PIP risk assessment and generation of a PIP risk quotient 103.

The PIP risk assessment and PIP risk quotient 103 can subsequently be made available by the PIP system 102 to a compliance entity 101. In one embodiment, the PIP risk quotient can be made available in real time. A real time assessment can allow the PIP system 102 to provide a suggested action which can be taken to address a particular risk quotient. The PIP system 102 can also take into consideration the input information in order to generate a suggested action. A suggested action may include, for example, limiting the scope of transactions entered into, discontinuing any transactions with affected participants, notifying authorities, or other appropriate actions.

The PIP system 102 can quantify risk due diligence 104 by capturing and storing a record of the information received and actions taken relating to a PIP account. Once quantified, the due diligence data can be utilized for presentation to regulatory bodies, shareholders, news media and/or other interested parties to mitigate adverse effects relating to a problematic account. The data can demonstrate that corporate governance is being addressed through tangible risk management processes.

The PIP system 102 can also aggregate risk quotients 105 to assess the level of PIP risk being tolerated by the institution. Other calculations, such as, for example, the sum, mean, average, or other calculation can be made by the PIP system 102 to further analyze PIP risk at a financial institution. If desired, a rating can be applied to an institution according to the amount for PIP risk tolerated by the institution.

Figure 2:
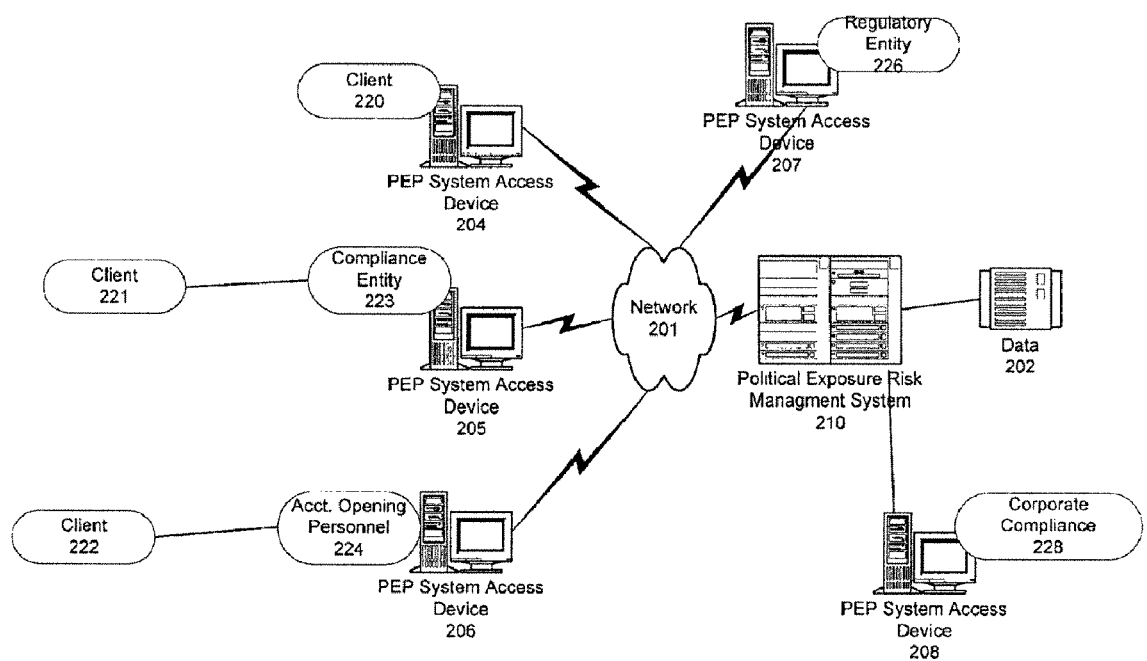
FIG. 2 illustrates a network on computer systems that can embody an enhanced online sales risk management system.

Referring now to FIG. 2, a network diagram illustrating one embodiment of the present invention is shown. An automated PIP system can include a computerized PIP system 210 accessible via a distributed network 201 such as the Internet, or a private network. A client 220-222, regulatory entity 226, compliance entity 223, account opening personnel 224, corporate compliance personnel 228 or other party interested in PIP risk management, can use a computerized system or network access device 204-208 to receive, input, transmit or view information processed in the PIP system 210. A protocol, such as the transmission control protocol internet protocol (TCP/IP) can be utilized to provide consistency and reliability.

Each network access device can include a processor, memory and a user input device, such as a keyboard and/or mouse, and a user output device, such as a display screen and/or printer. The network access devices 204-208 can communicate with the PIP system 210 to access data stored at the PIP system 210. The network access device 204-208 may interact with the PIP system 210 as if the PIP system 210 was a single entity in the network 200. However, the PIP system 210 may include multiple processing and database sub-systems, such as cooperative or redundant processing and/or database servers, that can be geographically dispersed throughout the network 201. In some implementations, groups of network access devices 204-208 may communicate with PIP system 210 through a local area network.

The PIP system 210 includes one or more databases 202 storing data relating to PIP risk management. The PIP system 210 may interact with and/or gather data from a client 220-222, compliance entity 223, account opening personnel 224, regulatory entity 226, corporate compliance personnel 228, or other person who is operating a network access device 204-208. Data gathered from an operator may be structured according to risk criteria and utilized to calculate a PIP risk quotient.

Typically a user will access the PIP system 210 using client software executed at a network access device 204-208. The client software may include a generic hypertext markup language (HTML) browser, such as Netscape Navigator or Microsoft Internet Explorer, (a "WEB browser"). The client software may also be a proprietary browser, and/or other host access software. In some cases, an executable program, such as a Java.TM. program, may be downloaded from the PIP system 210 to the client computer and executed at the client network access device or computer as part of the PIP system software. Other implementations include proprietary software installed from a computer readable medium, such as a CD ROM. The invention may therefore be implemented in digital electronic circuitry, computer hardware, firmware, software, or in combinations of the above. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

Figure 3:
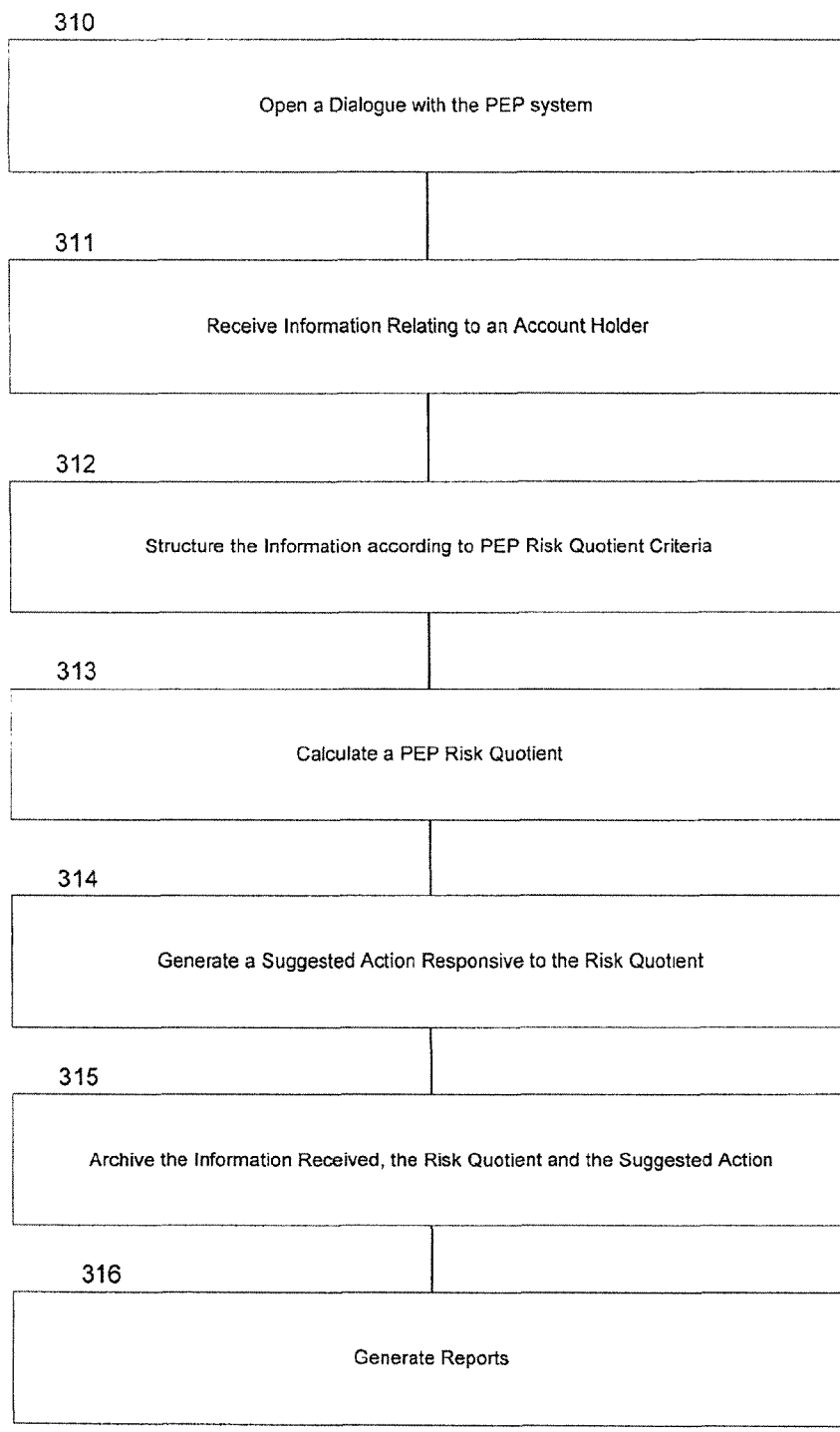
FIG. 3 illustrate a flow of exemplary steps that can be executed in practicing PIP risk management.

Referring now to FIG. 3, managing risk associated with financial transactions with political exposure can begin with opening a dialogue with an PIP system 310. Typically, the dialogue would be opened by presenting a GUI to a network access device accessible by a person or an electronic feed that will enter information relating to the account holder. The GUI will be capable of accepting data input via a network access device. An example of a GUI would include a series of questions relating to a client holding an account. Alternatively, information can be received directly into fields of a database, such as from a commercial data source. Questions can be fielded during a transaction, while updating account information, during an account opening interview, or at any other opportunity to gather information.

Alternatively, a dialogue can also be opened with a source of electronic data such as an external database, messaging system, news feed, government agency, or other automated data provider. In either case, the dialogue will enable the PIP system 102 to receive data relating to an account holder who may be politically exposed 311. Information can be received on an ongoing basis such that if new events occur in the world which affect the political exposure of an account holder, the PIP risk can be adjusted accordingly. In addition to the types of information listed previously that be indicative of high risk, the financial institution or compliance entity can receive information that relates to requests to involve a financial institution that is not accustomed to foreign account activity; requests for secrecy or exceptions to Bank Secrecy Act requirements, routing through a secrecy jurisdiction, or missing wire transfer information; unusual and unexplained fund or transaction activity, such as fund flow through several jurisdictions or financial institutions, use of a government-owned bank, excessive funds or wire transfers, rapid increase or decrease of funds or asset value not attributable to the market value of investments, high value deposits or withdrawals, wires of the same amount of funds into and out of the account, and frequent zeroing of account balance; and large currency or bearer transactions, or structuring of transactions below reporting thresholds. Other information can include activities the PIP is involved in, associates of the PIP, governmental changes, or other related events.

Sources of information can include, for example, publications issued by Treasury's Financial Crimes Enforcement Network ("FinCEN"), the State Department, the CIA, the General Accounting Office, Congress, the Financial Action Task Force ("FATF"), various international financial institutions (such as the World Bank and the International Monetary Fund), the United Nations, other government and non-government organizations, internet websites, news feeds, commercial databases, or other information sources.

The PIP system 210 can structure the information received according to defined PIP risk quotient criteria 312. For example, information received can be associated with criteria including a position held by the account holder, the country in which the position is held, how long the position has been held, the strength of the position, the veracity of previous dealings with persons from that country, the propensity of people in similar positions to execute unlawful or unethical transactions, the type of account or other criteria.

Types of accounts to be opened may include, for example: an individual account, a public company domiciled in a G-7 country or Hong Kong, a public company not domiciled in a G-7 country or Hong Kong, a corporate account regulated by a G-7 agency or a corporate account regulated by a non G-7 government agency, a private company or partnership, a holding company, an intermediary managed account such as a money manager or hedge fund, a trust or foundation, or other type of legal entity.

The PIP system 210 can receive the information and structure it according to predefined criteria or receive it in a pre-structured format. Receiving the information in a pre-structured format allows the PIP system 210 to proceed with calculating a risk quotient 313 without having to further structure the information. Information that cannot be easily structured can also be received and archived in order to facilitate a manual qualitative evaluation.

A PIP risk quotient can be calculated 313 by weighting the information received according to its importance in determining the likelihood of illegal or unethical dealings. Calculating a PIP risk quotient can be accomplished by assigning a numerical value to each field of information, wherein the numerical value is representative of the risk associated with a particular piece of information. For example, it may be determined one case that a government official from a G-7 country trading equities in a public company from a G-7 country poses minimal risk. Therefore this information from the first case is assigned a low numerical value, or even a negative numerical value. In a second case, a high ranking government official from an unstable third world country transacting in a corporate holding company may be viewed as indicative of a high risk. In another case, information conveying this high risk may be assigned a high numerical value. In addition, a weight can be assigned to a PIP risk category to which the information is assigned. Therefore a designated country may receive a higher weight than the position held, or vice versa. A Risk Quotient can be calculated by multiplying a weighted numerical value of the specific information times the category weighting.

For example, information received may indicate an account holder is a high ranking finance official from a G7 country. The ownership structure of a company the account holder wishes to transact is a public entity. A public entity may receive a numerical value of −5 because it is a relatively low risk ownership structure. In addition, this information may be included in a Company Profile category, wherein the Company Profile is assigned a category weighting of 3. Therefore, the net score for this ownership structure is −5 times 3 or −15. Similarly the account holder being a high ranking official from a G-7 country may also receive a low number such as 1. The PIP risk quotient for the account holder would be 1 times 3, or 3. All scores within the Company Profile can be summed to calculate a PIP risk quotient. In this case the PIP risk quotient is −15+3 which equals −12, indicating a low risk. Weighted risk scores from all associated categories can be summed to calculate a total Risk Quotient.

A suggested action can be generated that is responsive to the Risk Quotient 314. For example, in response to a high risk score a suggested action may be to not proceed with a transaction, or even to notify an authority. In response to a low risk score, the PIP system 210 may respond by completing transactions as usual. Intermediate scores may respond by suggesting that additional information be gathered, that transactions for this account be monitored, or other interim measures.

The PIP system 210 can also store, or otherwise archive PIP data and proceedings. For example the PIP system 210 can store information received, a Risk Quotient generated, and also the suggested actions to be taken 315. This information can be useful to quantify corporate governance and diligent efforts to address high risk situations. Accordingly, reports quantifying PIP risk management procedures, executed due diligence, corporate governance or other matters can be generated 316.

Figure 4:
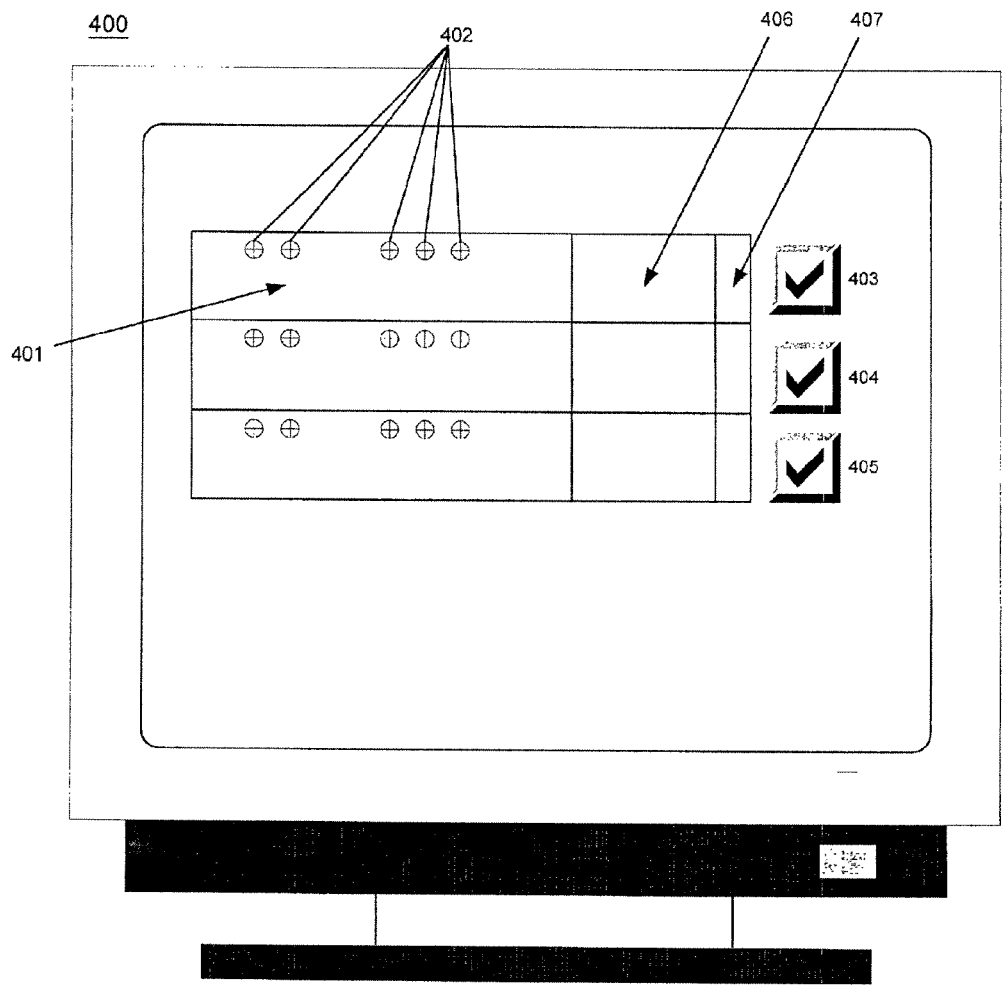
FIG. 4 illustrates an exemplary graphical user interface useful for gathering information according to the present invention.

Referring now to FIG. 4, an exemplary GUI for receiving information related to PIP risk management is illustrated 400. The GUI can include areas prompting for information, such as in the form of a key word or a question 413. Areas can also be included for an appropriate response 414. The area for an appropriate response 414 can, for example, receive text, allow a selection from choices proffered, or otherwise receive data into the computerized PIP system 102. A programmable user interactive device, such as a checkbox, X field, yes/no filed or other device can be utilized to indicate an answer, or otherwise input information. A category weighting 410 can also be indicated on the GUI. Typically the weighting will be predetermined. However, if desired the weighting can be modified by a user such that a weighting value, such as a numerical value, will be utilized to calculate a risk quotient. The receiving information GUI 400 can also include areas for displaying a response value 411 and a response score for the inquiry 412.

Figure 5:
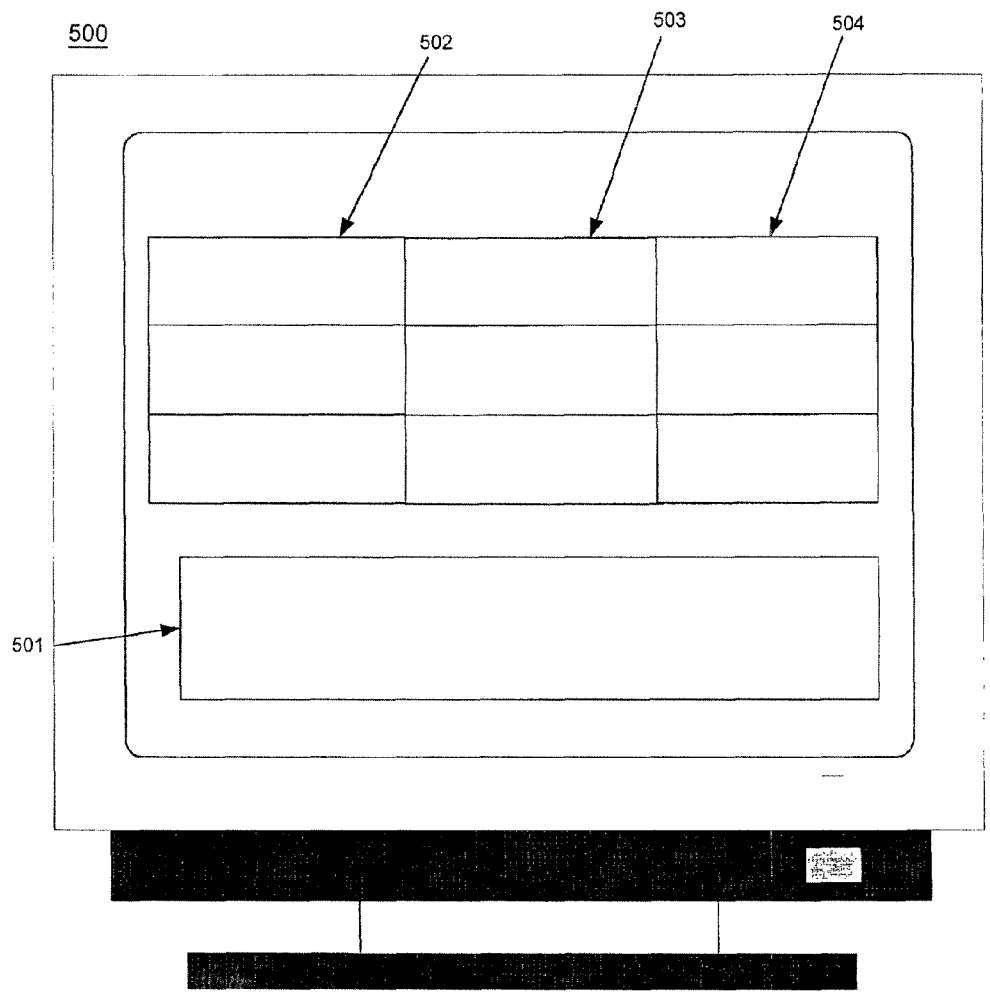
FIG. 5 illustrates an exemplary graphical user interface useful for presenting reports related to political exposure of a PIP.

Referring now to FIG. 5, an exemplary GUI for presenting reports or suggested actions related to PIP risk management is illustrated 500. The GUI for presenting reports 500 can include geographic areas of a user interface containing risk management procedures 501, including those procedures specifically followed in relation to a particular PIP. Other areas can include a list of electronic or hardcopy reports available concerning risk management efforts undertaken 502. Another area can include a list of risk quotients and/or calculations concerning the risk quotient, such as the average risk quotient for the financial institution, or the mean risk quotient 503. Still another area can contain information descriptive of a particular account holder or PIP 504.

A number of embodiments of the present invention have been described. Nevertheless, it will be understood that various modifications may be made without departing from the spirit and scope of the invention. For example, network access devices 204-208 can comprise a personal computer executing an operating system such as Microsoft Windows.TM., Unix.TM., or Apple Mac OS.TM., as well as software applications, such as a JAVA program or a web browser. Network access devices 204-208 can also be a terminal device, a palm-type computer, mobile WEB access device, a TV WEB browser or other device that can adhere to a point-to-point or network communication protocol such as the Internet protocol. Computers and network access devices can include a processor, RAM and/or ROM memory, a display capability, an input device and hard disk or other relatively permanent storage. Accordingly, other embodiments are within the scope of the following claims.

What is claimed is:

1. A processor-implemented method for facilitating management of risk related to political exposure associated with a financial transaction, comprising:
   receiving data relating to a financial transaction involving a politically identified person;
   structuring the received data according to political risk quotient criteria;
   calculating, via a processor, a political risk quotient based on the structured data;
   comparing the political risk quotient with a risk quotient threshold to determine a suggested action for proceeding with the financial transaction; and
   facilitating the financial transaction with the determined suggested action.

2. The method of claim 1, wherein the political risk quotient comprises a plurality of political risk scores.

3. The method of claim 2, wherein the financial transaction is associated with a financial institution, the method further comprising:
   aggregating the political risk quotient with a plurality of political risk quotients associated with a plurality of financial transactions associated with a financial institution;
   comparing the aggregate political risk quotient to a risk quotient threshold to assess exposure of the financial institution to political risk; and
   generating, based on the assessment, a suggested action for the financial institution.

4. The method of claim 1, wherein the suggested action is at least one of: (i) a recommendation to decline the financial transaction; (ii) a recommendation to gather additional information associated with the financial transaction; (iii) a recommendation to monitor the financial transaction; and (iv) notifying an authority.

5. The method of claim 1, wherein the political risk quotient criteria further comprise:
   a position held by an account holder, a country in which the position is held, how long the position has been held, a strength of the position, a veracity of previous dealings with persons from the said country, and a propensity of people in similar positions to engage in unlawful or unethical transactions.

6. The method of claim 1, wherein the financial transaction is at least one of: (i) a request to open a new financial account; and (ii) a financial transaction associated with an existing financial account.

7. The method of claim 2, wherein the financial transaction is associated with a financial institution, the method further comprising:
   calculating a mean political risk quotient for the financial institution through analysis of a plurality of political risk quotients; and generating, based on the mean political risk quotient for the financial institution, a suggested action for the financial institution.

8. A processor-implemented method for facilitating management of risk related to political exposure associated with a financial transaction, comprising:
   calculating, via a processor, a political risk score for each of a plurality of political risk categories based on financial transaction data associated with a financial transaction;
   calculating, based on the plurality of political risk category scores, an overall transaction political risk quotient associated with the financial transaction;
   comparing the overall transaction political risk quotient with a risk quotient threshold to determine a suggested action for proceeding with the financial transaction; and
   facilitating the financial transaction with the determined suggested action.

9. The method of claim 8, wherein the financial transaction is associated with a financial institution, the method further comprising:
   aggregating the overall transaction political risk quotient with a plurality of political risk quotients associated with a plurality of financial transactions to determine an aggregate political risk quotient associated with the financial institution; and
   generating, based on the aggregate political risk quotient associated with the financial transaction, a suggested action for the financial institution.

10. The method of claim 8, wherein the overall transaction political risk quotient is further calculated based on weights applied to each of the plurality of political risk categories.

11. The method of claim 8, wherein the suggested action is at least one of: (i) a recommendation to decline the financial transaction; (ii) a recommendation to gather additional information associated with the financial transaction; (iii) a recommendation to monitor the financial transaction; and (iv) notifying an authority.

12. The method of claim 8, wherein the financial transaction is at least one of: (i) a request to open a new account; and (ii) a transaction associated with an existing account.

13. The method of claim 8, wherein the financial transaction is associated with a financial institution, the method further comprising:
   calculating a mean political risk quotient for the financial institution though analysis of a plurality of political risk quotients; and
   generating, based on the mean political risk quotient for the financial institution, a suggested action for the financial institution.

14. The method of claim 8, wherein the overall transaction political risk quotient comprises a scaled numeric or a scaled alpha- numeric value.

15. A system for facilitating management of risk related to political exposure associated with a financial transaction, comprising:
   a memory;
   a processor disposed in communication said memory, and configured to issue a plurality of processing instructions stored in the memory, wherein the processor issues instructions to:
      receive data relating to a financial transaction involving a politically identified person;
      structure the received data according to political risk quotient criteria;
      calculate a political risk quotient based on the structured data;
      compare the political risk quotient with a risk quotient threshold to determine a suggested action for proceeding with the financial transaction; and
      facilitate the financial transaction with the determined suggested action.

16. The system of claim 15, wherein the financial transaction is associated with a financial institution and wherein the processor issues instructions to:
   aggregate the political risk quotient with a plurality of political risk quotients associated with a plurality of financial transactions associated with the financial institution;
   compare the aggregate political risk quotient to a risk quotient threshold to assess exposure of the financial institution to political risk; and
   generate, based on the assessment, a suggested action for the financial institution.

17. The system of claim 15, wherein the suggested action is at least one of: (i) a recommendation to decline the financial transaction; (ii) a recommendation to gather additional information associated with the financial transaction; (iii) a recommendation to monitor the financial transaction; and (iv) notifying an authority.

18. The system of claim 15, wherein the political risk quotient criteria comprise: a position held by an account holder, a country in which the position is held, how long the position has been held, a strength of the position, a veracity of previous dealings with persons from the said country, and a propensity of the people in similar positions to engage in unlawful or unethical transactions.

19. A system far facilitating management of risk related to political exposure associated with a financial transaction, comprising:
   a memory;
   a processor disposed in communication with said memory, and configured to issue a plurality of processing instructions stored in the memory, wherein the processor issues instructions to:
      calculate, via a processor, a plurality of category political risk scores based on financial transaction data associated with a transaction;
      calculate based on the plurality of category political risk scores an overall transaction political risk quotient associated with the financial transaction;
      compare the overall transaction political risk quotient with a risk quotient threshold to determine a suggested action for proceeding with the financial transaction; and
      facilitate the financial transaction with the determined suggested action.

20. The system of claim 19, wherein the financial transaction is associated with a financial institution, wherein the processor issues instructions to:
   aggregate the overall transaction political risk quotient with a plurality of political risk quotients associated with a plurality of financial transactions to determine an aggregate political risk quotient associated with a financial institution; and
   generating, based on the aggregate political risk quotient associated with the financial institution, a suggested action for the financial institution.

21. The system of claim 19, wherein the overall transaction is political risk quotient is further calculated based on weights applied to each of the plurality of political risk categories.

* * * * *